US010045202B2

United States Patent
Lee (10) Patent No.: US 10,045,202 B2
(45) Date of Patent: Aug. 7, 2018

(54) APPARATUS FOR NETWORK ACCESS SETUP AND METHOD THEREFOR

(71) Applicant: Jee Young Lee, Seoul (KR)

(72) Inventor: Jee Young Lee, Seoul (KR)

(73) Assignee: Jee Young Lee, Seoul (KR)

( * ) Notice: Subject to any disclaimer, the term of this patent is extended or adjusted under 35 U.S.C. 154(b) by 0 days.

(21) Appl. No.: 15/696,622

(22) Filed: Sep. 6, 2017

(65) Prior Publication Data

US 2017/0374543 A1     Dec. 28, 2017

Related U.S. Application Data

(63) Continuation of application No. PCT/KR2016/011999, filed on Oct. 25, 2016.

(30) Foreign Application Priority Data

Oct. 27, 2015     (KR) .................... 10-2015-0149722

(51) Int. Cl.
| | | |
|---|---|---|
| *H04W 8/14* | (2009.01) | |
| *H04W 8/20* | (2009.01) | |
| *H04W 8/24* | (2009.01) | |
| *H04W 12/06* | (2009.01) | |
| *H04M 3/42* | (2006.01) | |
| *H04W 8/26* | (2009.01) | |
| *H04L 12/14* | (2006.01) | |
| *H04W 4/24* | (2018.01) | |

(52) U.S. Cl.
CPC ............ *H04W 8/14* (2013.01); *H04L 12/1421* (2013.01); *H04M 3/42153* (2013.01); *H04W 8/205* (2013.01); *H04W 8/24* (2013.01); *H04W 8/26* (2013.01); *H04W 12/06* (2013.01); *H04W 4/24* (2013.01)

(58) Field of Classification Search
CPC ......... H04W 8/02; H04W 8/12; H04W 88/06; H04W 48/16
See application file for complete search history.

(56) References Cited

U.S. PATENT DOCUMENTS

| 2008/0153482 A1* | 6/2008 | Kongalath | .............. H04W 8/06 455/432.1 |
|---|---|---|---|
| 2013/0205134 A1* | 8/2013 | Holtmanns | ........... H04W 4/001 713/156 |

FOREIGN PATENT DOCUMENTS

| KR | 10-0882432 B1 | 2/2009 |
|---|---|---|
| WO | 2012/134058 A2 | 10/2012 |

\* cited by examiner

*Primary Examiner* — Omoniyi Obayanju
(74) *Attorney, Agent, or Firm* — Jefferson IP Law, LLP (57) ABSTRACT

Disclosed in one embodiment of the present invention is a method for a user staying in a first country to be authorized in advance, before entering a second country which is different from the first country, to use a network service on a user terminal in the second country, without buying a local USIM after arriving in the second country or using a roaming service.

11 Claims, 3 Drawing Sheets

APPARATUS FOR NETWORK ACCESS SETUP AND METHOD THEREFOR

CROSS-REFERENCE TO RELATED APPLICATION(S)

This application is a continuation application, claiming the benefit under § 365(c), of an International application filed on Oct. 25, 2016 and assigned application number PCT/KR2016/011999, which claimed the benefit of a Korean patent application filed on Oct. 27, 2015 in the Korean Intellectual Property Office and assigned Serial number 10-2015-0149722, the entire disclosure of each of which is hereby incorporated by reference.

TECHNICAL FIELD

The present invention relates to an apparatus and method for setting a network access right and, more particularly, to an apparatus and method for setting a network access right, wherein a user who is scheduled to go to a second country different from a first country in which the user stays can set a network access right in the second country through a smartphone prior to the departure.

BACKGROUND ART

A method of a user who uses a smartphone in an existing country to perform a telephone and data communication using the smartphone after going to a foreign country basically includes two methods.

If roaming, that is, the first method, is used, the user can use a telephone and data service as in the existing country even in the local country by requesting roaming at the airport without separately replacing a universal subscriber identification module (USIM) card. Furthermore, recently, most of smartphones have been configured to automatically perform roaming when a user powers off the smartphone and then powers on it after departure for user convenience.

If a method of mounting a local USIM, that is, the second method, is used, the user can freely use the smartphone in the local country within a preset amount of money as if the user uses a prepaid phone. In order to use this method, the user has to purchase a local USIM in the local country, mount the local USIM on the smartphone, and use the smartphone within the range in which the amount of money set in each USIM is not exceeded.

As described above, a method of using a smartphone in a local (foreign) country without any change is already present. If the methods are used, a relatively high cost must be paid compared to a cost for using a smartphone in an existing country.

First, roaming has a problem in that a cost for the roaming is six times higher than a cost for a prepaid phone in average to the extent that an excessively high roaming charge is introduced according to many news that are recently reported. Furthermore, if a user makes a call to an acquaintance who lives in a local country in the state in which the user uses roaming, the call is treated as an international call and thus a charge higher than a common call charge is assigned to the corresponding call.

Furthermore, in the case of the method using a local USIM, the local USIM can be used for a predetermined period only and cannot be used in other periods. Accordingly, if a user does not fully use the amount of money charged in the local USIM, the amount of money results in a profit of a local communication company, and the user cannot get the remaining amount back in any form.

A user has to inconveniently find out the place where a charging machine is located or a Wi-Fi zone if the amount of data charged by the user is fully consumed while using a prepaid phone. If the user is not proficient in a corresponding local language, the user may experience inconvenience attributable to the language barrier in the process of finding out a charging machine and charging the amount of money used through the charging machine.

DISCLOSURE

Technical Problem

An object of the present invention is to provide an apparatus and method for setting a network access right, which enable a user to obtain a network access right in a foreign country more conveniently at cheaper costs by determining and paying a communication fee system to be used in the foreign country in advance in his or her own country before the user goes to the foreign country.

Technical Solution

A method of setting a network access right according to an embodiment of the present invention for achieving the object includes an identification information transmission step of extracting user identification information and terminal identification information from a terminal of a user who stays in a first country and transmitting the user identification information and the terminal identification information to a communication company server of a second country; a user input information request reception step of receiving an input request for second country entry information of the user transmitted by the communication company server of the second country based on a result of a determination of the communication company server of the second country which has determined that the user is a user to which a network access right has been assigned in the first country through the terminal authenticated by a communication company server of the first country based on the extracted user identification information and the terminal is a terminal capable of using a network in the second country based on the extracted terminal identification information; a user input information transmission step of transmitting the second country entry information inputted to the terminal in response to the input request to the communication company server of the second country; and an access right assignment step of assigning a network access right within the second country to the terminal of the user based on information transmitted by the communication company server of the second country if the terminal is found to be located in the second country by communication company server of the second country based on location information transmitted from the terminal to the communication company server of the second country.

An apparatus for setting a network access right according to another embodiment of the present invention for achieving the object includes an identification information transmission unit extracting user identification information and terminal identification information from a terminal of a user who stays in a first country and transmitting the user identification information and the terminal identification information to a communication company server of a second country; a user input information request reception unit receiving an input request for second country entry information of the user transmitted by the communication company server of the second country based on a result of a determination of the communication company server of the second country which has determined that the user is a user to which a network access right has been assigned in the first country through the terminal authenticated by a communication company server of the first country based on the extracted user identification information and the terminal is a terminal capable of using a network in the second country based on the extracted terminal identification information; a user input information transmission unit transmitting the second country entry information inputted to the terminal in response to the input request to the communication company server of the second country; and an access right assignment unit assigning a network access right within the second country to the terminal of the user based on information transmitted by the communication company server of the second country if the terminal is found to be located in the second country by communication company server of the second country based on location information transmitted from the terminal to the communication company server of the second country.

Advantageous Effects

In accordance with the present invention, a user can use the network of a communication company of a second country for a limited time after entering the second country by selecting and paying a charge for a network service to be used in the second country when the user stays in a first country.

BEST MODE FOR INVENTION

A method of setting a network access right according to an embodiment of the present invention for achieving the object includes an identification information transmission step of extracting user identification information and terminal identification information from a terminal of a user who stays in a first country and transmitting the user identification information and the terminal identification information to a communication company server of a second country; a user input information request reception step of receiving an input request for second country entry information of the user transmitted by the communication company server of the second country based on a result of a determination of the communication company server of the second country which has determined that the user is a user to which a network access right has been assigned in the first country through the terminal authenticated by a communication company server of the first country based on the extracted user identification information and the terminal is a terminal capable of using a network in the second country based on the extracted terminal identification information; a user input information transmission step of transmitting the second country entry information inputted to the terminal in response to the input request to the communication company server of the second country; and an access right assignment step of assigning a network access right within the second country to the terminal of the user based on information transmitted by the communication company server of the second country if the terminal is found to be located in the second country by communication company server of the second country based on location information transmitted from the terminal to the communication company server of the second country.

The method further includes an access approval information reception step of receiving network access approval information corresponding to the second country entry information from the communication company server of the second country in the first country. The access right assignment step may include an access approval information transmission step of transmitting the network access approval information to the communication company server of the second country if the terminal is found to be located in the second country by the communication company server of the second country based on the location information transmitted from the terminal to the communication company server of the second country and a right assignment step of assigning the network access right within the second country to the terminal of the user based on information transmitted by the communication company server of the second country in response to the network access approval information transmitted to the communication company server of the second country.

In the method, the network access approval information may be a globally unique temporary identifier (GUTI).

In the method, in the user input information request reception step, an input request for network service information in addition to the second country entry information may be received from the communication company server of the second country. In the user input information transmission step, the second country entry information and network service information inputted to the terminal in response to the input request may be transmitted to the communication company server of the second country. In the access right assignment step, if the terminal is found to be located in the second country by the communication company server of the second country based on the location information transmitted from the terminal to the communication company server of the second country, the network access right within the second country may be extracted from approval information transmitted by the communication company server of the second country based on the second country entry information and the network service information and assigned to the terminal of the user.

In the method, the second country entry information may be information about a date and time in which the user enters the second country, and the network service information may be at least one piece of data rate system information predetermined to be capable of being provided to the user by the communication company server of the second country.

In the method, the user identification information may include code of the first country, communication company code of the first country, and subscription authentication code of the user.

In the method, the terminal identification information may include the manufacturing country of the terminal, the manufacturing date of the terminal, and the manufacturer of the terminal.

In the method, the terminal identification information may be an international mobile equipment identity (IMEI).

An apparatus for setting a network access right according to another embodiment of the present invention for achieving the object includes an identification information transmission unit extracting user identification information and terminal identification information from a terminal of a user who stays in a first country and transmitting the user identification information and the terminal identification information to a communication company server of a second country; a user input information request reception unit receiving an input request for second country entry information of the user transmitted by the communication company server of the second country based on a result of a determination of the communication company server of the second country which has determined that the user is a user to which a network access right has been assigned in the first country through the terminal authenticated by a communication company server of the first country based on the extracted user identification information and the terminal is a terminal capable of using a network in the second country based on the extracted terminal identification information; a user input information transmission unit transmitting the second country entry information inputted to the terminal in response to the input request to the communication company server of the second country; and an access right assignment unit assigning a network access right within the second country to the terminal of the user based on information transmitted by the communication company server of the second country if the terminal is found to be located in the second country by communication company server of the second country based on location information transmitted from the terminal to the communication company server of the second country.

In the apparatus, the user input information request reception unit may receive an input request for network service information from the communication company server of the second country in addition to the second country entry information. The user input information transmission unit may transmit the second country entry information and network service information inputted to the terminal in response to the input request to the communication company server of the second country. The access right assignment unit may extract the network access right within the second country from approval information transmitted by the communication company server of the second country based on the second country entry information and the network service information if the terminal is found to be located in the second country by the communication company server of the second country based on the location information transmitted from the terminal to the communication company server of the second country, and may assign the extracted network access right to the terminal of the user.

The present invention may provide a computer-readable recording medium on which a program for executing the method of setting a network access right for achieving the object has been recorded.

Mode for Invention

The present invention may be modified in various ways and may have some embodiments. Specific embodiments are to be illustrated in the drawings and are to be described the detailed description. The effects and characteristics of the present invention and a method for achieving them will become evident with reference to the embodiments described in detail along with the drawings. However, the present invention is not limited to the following embodiments, but may be implemented in various forms.

Hereinafter, the embodiments of the present invention are described in detail with reference to the accompanying drawings. In the drawings, the same or corresponding elements are assigned the same reference numerals, and a redundant description thereof is omitted.

In the following embodiments, terms, such as the first and the second, are not used as limiting meanings, but are used to distinguish one element from the other element.

In the following embodiments, an expression of the singular number includes an expression of the plural number unless clearly defined otherwise in the context.

In the following embodiments, terms, such as include or have, are intended to designate that a characteristics or element described in the specification is present, and do not exclude the possible addition of one or more other characteristics or elements in advance.

If any embodiment can be differently implemented, a specific process sequence may be performed differently from a described sequence. For example, two processes that are contiguously described may be substantially performed at the same time or may be performed in sequence opposite a described sequence.

Figure 1:
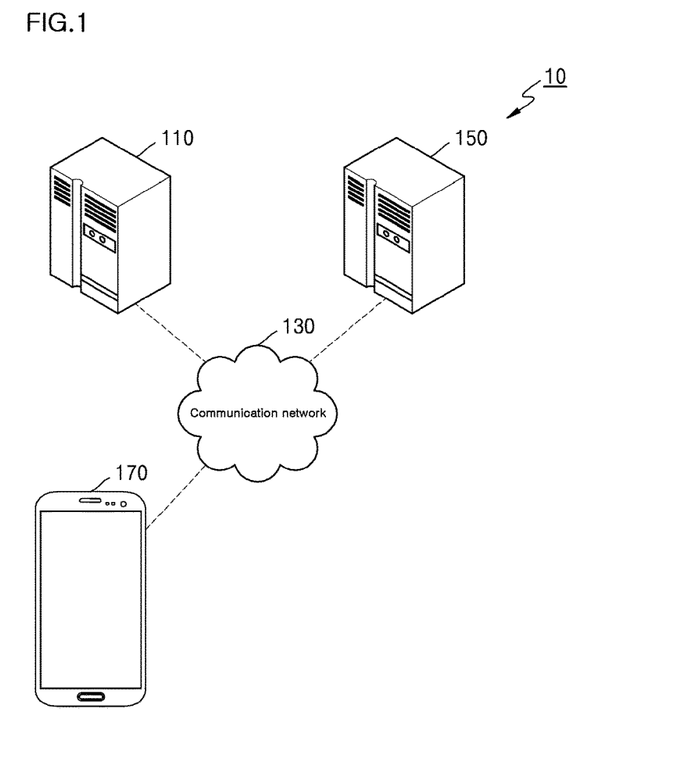
FIG. 1 is a diagram schematically showing the entire configuration of a system for setting a network access right according to the present invention.

FIG. 1 is a diagram schematically showing the entire configuration of a system for setting a network access right according to the present invention.

From FIG. 1, it may be seen that the system 10 for setting a network access right according to the present invention includes a first country communication company server 110 exchanging various data over a communication network 130, a second country communication company server 150 and a user terminal 170.

The first country communication company server 110 means the server of a communication company present in the first country in which a user stays before the user enters the second country. In this case, the first country and the second country are different countries. The user is the state in which a network access right in the first country has been set in the user terminal 170 by the first country communication company server 110 in accordance with a valid communication contract before the user enters the second country and thus the user has no problem in making and receiving a call or using wireless Internet through the user terminal 170 based on a rate system subscribed by the user in the first country.

The communication network 130 between the first country communication company server 110, the second country communication company server 150 and the user terminal 170 means various wired/wireless networks over which data can be sequentially transmitted and received according to a program installed in each server or the user terminal.

The second country communication company server 150 means the server of a communication company present in the second country at which the user has arrived after the user left the first country. In a conventional technology, the user could set a network access right within the second country in the user terminal 170 by purchasing a local USIM and mounting the local USIM on the user terminal 170 after the user requested roaming in the first country in advance and entered the second country or arrived at the second country.

In the present invention, the second country communication company server 150 functions to assign a network access right within the second country to the user terminal 170 through a specific procedure although the user enters the second country or arrives at the second country, does not purchase a local USIM, and does not mount the local USIM on the user terminal 170 after the user did not request roaming in the first country in advance.

More specifically, in the present invention, the second country communication company server 150 performs a comprehensive function of not only assigning a network access right within the second country to the user terminal 170, but determining how different quality of service (QoS) policy will be applied to each user terminal 170 and generating and managing a history regarding when the user terminal 170 accessed the network, how much has the user terminal 170 used data, and how long has the user terminal 170 accessed the network.

For example, if the second country is Republic of Korea that provides a network service to a user based on long term evolution (LTE) that is the fourth-generation mobile communication system, the second country communication company server 150 may include not only an evolved Node B (eNB) wirelessly communicating with the user terminal 170, but a serving gateway (S-GW) and mobility management entity (MME) connected to the eNB in a wired manner, and may perform functions, including a packet data network gateway (P-GW), a home subscriber server (HSS), a policy and charging rule function (PCRF), a subscriber profile repository (SPR), an online charging system (OCS), and an offline charging system (OFCS) connected to the S-GW and the MME in a wired manner.

An additional process for the second country communication company server 150 to assign a network access right to the user terminal 170 is described in detail later with reference to FIGS. 2 and 4.

In this case, the first country communication company and the second country communication company mean respective Internet service providers (ISPs) in the first country and the second country. The first country communication company and the second country communication company have established an alliance relation. If there is a request from the server of one communication company, the server of the other communication company that has received the request may transmit information corresponding to the request to the communication company server that has requested the transmission of the information. Specifically, the server of the second country communication company may update required information in such a way as to periodically fetch some of data stored in the server of the first country communication company in order to secure a faster response speed.

The user terminal 170 means a portable terminal including a telephone function. The user terminal 170 includes various wired/wireless communication functions, and includes machine buttons, a touch panel, etc. so that input from the user can be received. The user terminal 170 includes a display unit for outputting a procedure of setting a network access right according to the present invention in the user terminal 170 to the user through a screen. The user may set a network access right within the second country in the user terminal 170 using a user interface (UI) screen displayed on the display unit.

The user terminal 170 includes user identification information and terminal identification information. The user identification information is included in a universal subscriber identity module (USIM) card in which various encryption keys are stored. In this case, the user identification information means information for confirming whether a communication company server is a server of a corresponding communication company to which the user has subscribed when the user terminal 170 performs communication with the communication company server of the first country or the second country.

For example, the user identification information may be an integrated circuit card identifier (ICCID). The ICCID includes a combination of a 19-digit or 20-digit alphabetical letter and number, and includes country code and mobile communication company provider code. For another example, the user identification information may be an international mobile subscriber identity (IMSI). The IMSI includes a 15-digit number and includes country code and mobile communication company provider code like the ICCID.

The aforementioned ICCID and IMSI are examples of the user identification information. In the present invention, the user identification information stored in the user terminal 170 may be information about a different form, name and standard other than the ICCID or IMSI.

The user terminal 170 further includes terminal identification information in addition to the user identification information. The terminal identification information is information capable of confirming whether the user terminal 170 is a legitimate terminal, and means information including at least one of the manufacturing country of the user terminal 170, the manufacturer of the user terminal 170, the manufacturing date of the user terminal 170 and the model of the user terminal 170.

For example, the terminal identification information may be an international mobile equipment identity (IMEI). The IMEI is unique identification code assigned to the user terminal 170 by a terminal manufacturer, and includes information about the manufacturing country, manufacturer, manufacturing date and model of the user terminal 170. The IMEI is an example of the terminal identification information. In the present invention, the terminal identification information stored in the user terminal 170 may be information about a different form, name and standard other than the IMEI.

The user terminal 170 transmits and receives various types of information to and from the first country communication company server 110 over a communication network provided by the first country communication company server 110 when the user stays in the first country. Furthermore, the user terminal 170 communicates with the second country communication company server 150 via the first country communication company server 110 over a communication network provided by the first country communication company server 110 when the user stays in the first country.

After the user departs from the first country and enters the second country, the second country communication company server 150 verifies whether the user terminal 170 has a network access right. In accordance with the present invention, if a network access right within the second country is present in the user terminal 170, the user can use a network within the second country through the user terminal 170.

Figure 2:
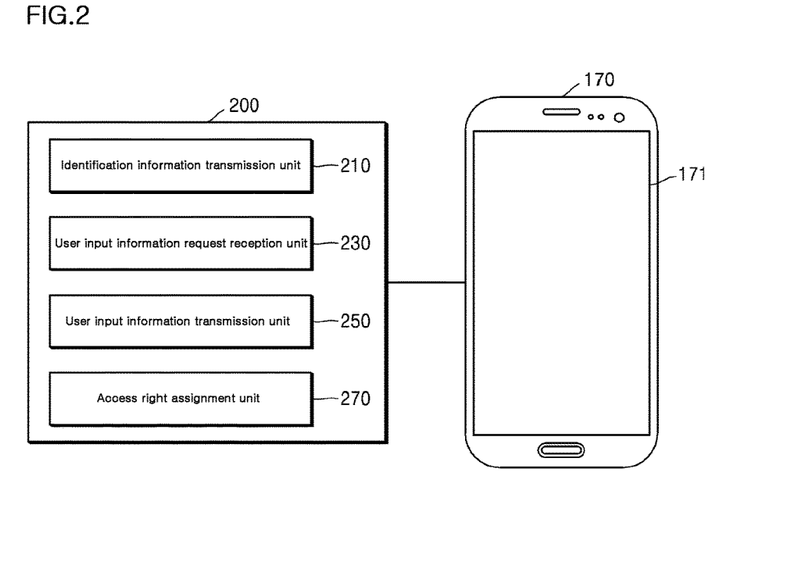
FIG. 2 is a diagram schematically showing an apparatus for setting a network access right and a user terminal according to an embodiment of the present invention.

FIG. 2 is a diagram schematically showing an apparatus for setting a network access right and the user terminal according to an embodiment of the present invention.

Although not shown in FIG. 2 for convenience of description, the elements already described with reference to FIG. 1 are described using the same reference numerals as those of FIG. 1.

The user terminal 170 shown along with the apparatus 200 for setting a network access right according to an embodiment of the present invention means an electronic device, including a display unit for displaying a screen 171 and an input device for receiving data from the user. The input device included in the user terminal 170 may be at least one of a keyboard, a mouse, a trackball, a microphone, a machine button and a touch panel.

Referring to FIG. 2, the apparatus 200 for setting a network access right according to an embodiment of the present invention may correspond to at least one processor or may include at least one processor. Accordingly, the apparatus 200 for setting a network access right may be driven in a form in which the apparatus is included in a different hardware device, such as a microprocessor or a general purpose computer system. That is, the apparatus 200 for setting a network access right may be mounted on the user terminal 170 without any change or may be implemented to be connected to the user terminal 170 in a wired or wireless manner and to influence contents displayed on the screen 171 of the user terminal 170.

The apparatus 200 for setting a network access right shown in FIG. 2 illustrates only elements for highlighting only characteristics of an embodiment of the present invention. Accordingly, a person having ordinary skill in the art will understand that other general elements may be further included in another embodiment different from the embodiment shown in FIG. 2 in addition to the elements shown in FIG. 2.

The apparatus 200 for setting a network access right according to an embodiment of the present invention controls contents displayed on the screen 171 of the user terminal 170. More specifically, the apparatus 200 for setting a network access right controls contents displayed on the screen 171 of the user terminal 170 so that the contents are differently displayed in response to the user's input, and sets the network access right of the user terminal 170 based on information received from the second country communication company server 150 so that the user can use a network service through the user terminal 170 in the second country. For example, after a network access right within the second country is set in the user terminal 170, the user can make an Internet call to the user's acquaintance in the second country through the user terminal 170 or may access the Internet and search for various types of information.

From FIG. 2, it may be seen that the apparatus 200 for setting a network access right according to an embodiment of the present invention includes a identification information transmission unit 210, a user input information request reception unit 230, a user input information transmission unit 250 and an access right assignment unit 270.

First, the identification information transmission unit 210 receives a user's approval from the terminal of the user who stays in the first country, extracts user identification information and terminal identification information, and transmits them to the second country communication company server 150. In this step, a channel has not been open between the second country communication company server 150 and the user terminal 170 in the first country because a country in which the second country communication company server 150 is present and a country in which the user terminal 170 is present are different and communication has not been set up between the two objects in advance. Accordingly, the user identification information and terminal identification information transmitted by the identification information transmission unit 210 are transferred to the second country communication company server 150 via the first country communication company server 110.

The first country communication company server 110 and the second country communication company server 150 are the servers of Internet service providers (ISPs) located in the first country and the second country, respectively, and do not have a special limit in transmitting and receiving various types of information between them in accordance with a previously made contract and constructed system as described above.

As described above with reference to FIG. 1, an ICCID or IMSI may be used as the user identification information, and an IMEI may be used as the terminal identification information.

Specifically, the user identification information means information capable of confirming who the user is who uses the user terminal 170, and may include mobile country code (MCC), mobile network code (MNC) and a mobile subscriber identify number (MSIN).

In this case, to confirm who the user is means determining whether the user has made a communication contract with a communication company and a network access right has been assigned to the user in a specific area. More specifically, the communication company determines whether the user is a person who has made a communication contract with the communication company and the user has a network access right based on the user identification information. If the user has the network access right, the communication company determines whether to provide a service to the user based on which quality of service (QoS) and how the amount of money used will be charged if the user exceeds the amount of data basically given to the user.

As an example of the user identification information, if the user continues to stay in the first country, MCC included in the user identification information is the code of the first country, MNC included in the user identification information is unique code of a communication company of the first country to which the user has subscribed, and MSIN included in user identification information is a unique number assigned by the communication company of the first country when the user subscribes to the communication company of the first country. In this case, the MSIN is a concept including all of forms of subscriber authentication code including numbers and alphabetical letters in addition to numbers.

The terminal identification information means information capable of confirming that the user terminal 170 is what type of terminal, and may include at least one of the manufacturing country of the user terminal 170, the manufacturing date of the user terminal 170 and the manufacturer of the user terminal 170. What the communication company server confirms the user terminal 170 based on the terminal identification information means determining whether the user terminal 170 has legally become the belongings of the user and also means whether the user terminal 170 is a model capable of using a network service in a specific country.

First, what the communication company server determines whether the user terminal 170 has legally become the belongings of the user based on the terminal identification information includes determining that the user terminal 170 is not a lost or stolen terminal, but whether the user terminal is a terminal purchased by the user through a common route. Furthermore, what the communication company server determines whether the user terminal 170 is a model capable of using a network service in a specific country based on the terminal identification information includes determining whether the user terminal 170 has no problem in a function or setting capable of using a network facility installed in the country of the corresponding communication company.

In order to use the user terminal 170, such as a smartphone, in several countries without replacing the user terminal, a country lock and carrier lock in the user terminal 170 must have been released, and the user terminal 170 can support a frequency band of the communication company. For example, in order for a user who has entered Korea to use his or her smartphone in Korea, a country lock and carrier lock in the smartphone must have been released and must support 2100 MHz, that is, a frequency band used by a communication company in Korea.

The user identification information and the terminal identification information may be extracted from the user terminal 170 through only the user's approval because they belong to unique personal information of the user. When an extraction approval for the user identification information and the terminal identification information is input by the user through the screen 171 or input device of the user terminal 170, the identification information transmission unit 210 extracts the user identification information and the terminal identification information from the user terminal 170 and transmits them to the second country communication company server 150 via the first country communication company server 110.

The user input information request reception unit 230 receives second country entry information of the user and an input request for network service information from the second country communication company server 150. In this process, what the user input information request reception unit 230 receives the second country entry information and the input request for the network service information from the second country communication company server 150 means that the second country communication company server 150 confirms the user identification information and terminal identification information received from the identification information transmission unit 210 and determines that the user is a user of the first country who uses a valid terminal based on the results of the confirmation.

More specifically, the second country communication company server 150 may confirm that the user is a person who stays in the first country, that the user has made a communication contract with the communication company of the first country, that a network access right in the first country has been assigned to the user and that the user accesses the Internet based on the right, and the fact that the user has accessed the second country communication company server 150 by receiving the user identification information. As described above with reference to FIG. 1, the second country communication company server 150 has previously stored information for confirming who the user is in such a way as to request information about the user from the first country communication company server 110 whenever the information is necessary or to periodically fetch the information.

In an optional embodiment, the second country communication company server 150 may share a second secret key with the first country communication company server 110 in order to confirm that the user is a legitimate person who can use a network in the second country by receiving the user identification information. In this case, the second secret key is a secret key shared only between the first country communication company server 110 and the second country communication company server 150, and is a concept different from a first secret key shared only between the first country communication company server 110 and the user terminal 170. The present optional embodiment may be applied to a case where only some of user identification information is transmitted to the second country communication company server 150 because information that needs to be shared only between the first country communication company server 110 and the user terminal 170 is included in the user identification information due to a security problem in the USIM of the user terminal 170.

In general, when the user terminal 170 is in the first country, the following user authentication procedure is performed along with the first country communication company server 110. First, when the user terminal 170 reads user identification information (an IMSI, an ICCID, etc.) from a USIM card and transmits the user identification information to the first country communication company server 110, the authentication center (AuC) of the first country communication company server 110 generates an authentication vector based on the first secret key shared with the USIM card and transmits the authentication vector to the user terminal 170. The USIM card of the user terminal 170 generates an authentication response value using the authentication vector based on the first secret key and transmits the authentication response value to the authentication center AuC of the first country communication company server 110. The authentication center AuC compares the received authentication response value RES with an authentication response value XRES generated by the authentication center AuC, thereby completing the authentication procedure.

The present optional embodiment is a concept extended from the authentication procedure. When the second country communication company server 150 receives the user identification information (an IMSI, etc.) from the user terminal 170 and transfers it to the first country communication company server 110, the first country communication company server 110 transmits C, obtained by encrypting the results of conversion from a comparison value A to an authentication vector B based on the first secret key using the second secret key again, to the second country communication company server 150. The second country communication company server 150 transmits the authentication vector B, obtained by decoding the C using the second secret key, to the user terminal 170. The USIM card of the user terminal 170 generates a target comparison value A' for the received authentication vector B, and transmits the target comparison value A' to the second country communication company server 150. The target comparison value A' is encrypted by the second country communication company server 150 based on the second secret key and then transmitted to the first country communication company server 110. Next, the first country communication company server 110 matches the received target comparison value A' with the comparison value A, thereby completing the authentication procedure.

The authentication procedure is performed in the same manner in the case where the user terminal 170 transmits the user identification information to the second country communication company server 150 when the user is located in the first country and in the case where the user enters the second country and the user terminal 170 transmits the user identification information to the second country communication company server 150. As described above, when the user is located in the first country, the authentication procedure may be performed via the first country communication company server 110 because the second country communication company server 150 and the user terminal 170 cannot directly communicate with each other.

Furthermore, the second country communication company server 150 may confirm that the user terminal 170 was fabricated in the first country and has become the belongings of the user through a legitimate route by receiving the terminal identification information. In this process, the second country communication company server 150 may additionally confirm whether the user terminal 170 is a terminal capable of using a network service provided by the communication company of the second country.

If it is determined that the user is a user of the first country who uses a valid terminal through the user identification information and the terminal identification information, the second country communication company server 150 requests the user to input second country entry information and network service information. The user input information request reception unit 230 receives the request so that the user terminal 170 displays the requested contents on the screen 171.

The second country entry information is information about a date, time and location in which the user enters the second country. The network service information is information about the type of service and a charge for each service which can be used through the second country communication company after the user enters the second country. In this process, the user selects a rate system to be used after entering the second country and pays the amount of money corresponding to the selected rate system.

That is, in accordance with the present invention, the user can select and pay a rate system to be used in the second country through the screen of the user terminal 170 that is displayed in a language familiar to the user in the first country in which the user is located before the user enters the second country. Accordingly, convenience of a common user who is not accustomed to the use of a foreign language can be increased because the user does not need to use a local language after entering the second country, does not need to purchase a local USIM or purchase a local USIM to be used in the second country in advance in the first country.

The user input information transmission unit 250 transmits the second country entry information and network service information, input by the user, to the second country communication company server 150 via the first country communication company server 110. The user may check second country entry information and an input request for network service information, transmitted by the second country communication company server 150, through the screen 171 of the user terminal 170. The user inputs the second country entry information and network service information through the input device of the user terminal 170.

The second country communication company server 150 checks when the user will enter the second country and that the user will use a network service based on which rate system based on the second country entry information and network service information received from the user input information transmission unit 250. In this process, the user inputs user personal information necessary to pay a charge for a network service to be used by the user in the second country based on contents displayed on the screen 171 of the user terminal 170. Means and a process for the user to pay the charge for the network service to be used in the second country complies with an application (e.g., In App payment) installed in the user terminal 170, and is not limited to a specific method that was present in the past or is not present.

Next, the second country communication company server 150 receives valid second country entry information and network service information from the user input information transmission unit 250, and additionally receives personal information (a card number capable of overseas payment, etc.) for paying the rate system of the network service. When the user validly completes the payment for the rate system to be used in the second country, the second country communication company server 150 stores the user identification information and the terminal identification information in the second country communication company server 150, and performs control so that the user according to the user identification information may user a network through the user terminal 170 according to the terminal identification information for a limited time based on the second country entry information input by the user in the second country.

The second country communication company server 150 may include an authentication authorization accounting (AAA) proxy server for smoothly storing and searching for user identification information and terminal identification information of many users. The AAA proxy server may be implemented in a form including a mobile management entity (MME), a home subscriber server (HSS), a policy and charging rule function (PCRF) and a subscriber profile repository (SPR) if the second country communication company provides a network service to the user terminal 170 through LTE, that is, the fourth-generation mobile communication network system. When the user enters the second country, the access right assignment unit 270 assigns a network access right within the second country to the user terminal 170 based on information transmitted by the second country communication company server 150. The second country communication company server 150 may check that the user terminal 170 owned by the user has entered the second country based on location information transmitted by the second country communication company server 150.

The network access right assigned to the user terminal 170 by the access right assignment unit 270 is based on information transmitted by the second country communication company server 150. In order for information for setting the network access right within the second country in the user terminal 170 from the second country communication company server 150 to be transmitted, the access right assignment unit 270 needs to access the second country communication company server 150 through the user terminal 170 after the user enters the second country based on a date, time, location, etc. according to the second country entry information.

When the network access right within the second country is assigned to the user terminal 170, the user can use a network through the user terminal in the second country based on the detailed contents of the network service whose payment has been previously completed in the first country. In this case, the user may install a mobile Voice over Internet Protocol (mVoIP) service application, such as Skype, in the user terminal 170 and freely use a telephone or text message.

Furthermore, the USIM card used by the user in the first country has been mounted on the user terminal 170, and what the user identification information and the terminal identification information are valid information and the charge for the rate system to be used in the second country has been paid in advance (in the first country) has been authenticated by the second country communication company server 150 through the aforementioned process. Accordingly, the user can freely use a network within the limit of the prepaid rate system as if the user uses a roaming service in the state in which a local USIM has not been separately purchased and not mounted on the user terminal 170.

A customer information management system (not shown) included in the second country communication company server 150 stores the results of the authentication of the user and the user terminal 170, performed by the second country communication company server 150, along with the user identification information and the terminal identification information. When the user uses various services over a network in the second country, a company that provides a corresponding service may use the results of the authentication as information for distinguishing the user and the user terminal 170 from another user and another user terminal. That is, the second country communication company server 150 may transmit the results of the authentication to a service company that will be used by the user as information for evidencing the user and the user terminal in response to a request from the service company.

In one optional embodiment, the access right assignment unit 270 may transmit a network access right transmission request to the second country communication company server 150 and receive the network access right within the second country from the second country communication company server 150. In the present optional embodiment, the network access right transmission request includes user identification information, terminal identification information and location information of the user terminal 170.

If the user identification information and terminal identification information included in the network access right transmission request are identical with any pair of pieces of information already stored in the second country communication company server 150, the second country communication company server 150 determines that a legitimate user has hold the valid user terminal 170 capable of using a network service in the second country.

Furthermore, the second country communication company server 150 may determine whether the user terminal 170 is located in the second country based on the location information of the user terminal 170 included in the network access right transmission request. For example, when the location information of the user terminal 170 is indicated in latitude and longitude based on a global positioning system, the second country communication company server 150 may determine whether the user terminal 170 is located in the second country and a corresponding location is identical with a location first included in the second country entry information by the user if the user terminal 170 is located in the second country.

Finally, if it is determined that a legitimate user is a person who has a network access right within the second country and has entered the second country within a period by the user while carrying a valid terminal, the second country communication company server 150 transmits information for assigning the network access right within the second country to the user terminal 170. The access right assignment unit 270 assigns the network access right to the user terminal 170 based on the received information.

In accordance with the present optional embodiment, the second country communication company server 150 may obtain information regarding that the user terminal 170 has been located in the second country based on location information of the user terminal 170 collected by a GPS function generally included in a smartphone. Accordingly, the second country communication company server 150 can set the network access right in the user terminal 170.

In another optional embodiment, when the user enters the second country, the access right assignment unit 270 may transmit network access approval information, received from the second country communication company server 150, to the second country communication company server in response to second country entry information transmitted by the second country communication company server 150 in the first country, and may assign a network access right within the second country to the user terminal 170 based on the information transmitted by the second country communication company server in response to the received network access approval information.

In the present optional embodiment, when the user input information transmission unit 250 transmits second country entry information to the second country communication company server 150 in the state in which the user stays in the first country, the second country communication company server 150 stores the second country entry information and also transmits network access approval information corresponding to the second country entry information to the user terminal 170. The network access approval information is information transmitted to the user terminal 170 if the second country communication company server 150 has approved that the user uses a network temporarily in the second country for a period designed by the user in the user terminal 170. The network access approval information may be received by the user input information transmission unit 250 or the access right assignment unit 270 or may be received by a network access approval information reception unit (not shown).

For example, the network access approval information may be a globally unique temporary identifier (GUTI) if a mobile communication network system used in the second country is LTE. The GUTI is one of codes for identifying a user (communication company subscriber) who is present in a network like the aforementioned IMSI. When the user terminal 170 first accesses an LTE network, the user terminal 170 transmits the IMSI to a communication company server. The communication company server may identify the user terminal 170 based on the IMSI, but identifies user terminals 170 using GUTIs which can be changed every time for security and can identify the respective user terminals 170 instead of a permanent IMSI.

As described above, when the user input information transmission unit 250 validly transmits the second country entry information to the second country communication company server, the second country communication company server 150 stores the IMSI of the user terminal 170, and transmits a GUTI that enables the second country communication company server 150 to identify the user terminal 170 to the user terminal 170 when the user uses a network within the second country through the user terminal 170 in accordance with the setting of the network access right in the user terminal 170.

In this case, the GUTI transmitted to the user terminal 170 is network access approval information. The GUTI is stored in the user terminal 170. When the user enters the second country, the stored GUTI is transmitted from the access right assignment unit 270 to the second country communication company server 150. The network access approval information is information generated in response to the second country entry information input by the user. Accordingly, the second country communication company server 150 may check that the user enters the second country and requests the setting of a network access right for the user terminal 170 from the second country communication company server 150 based on information related to the time when the network access approval information received from the access right assignment unit 270 is generated and a user included in the network access approval information.

Accordingly, if the network access approval information is valid information, the second country communication company server 150 transmits information necessary to set the network access right within the second country in the user terminal 170 to the access right assignment unit 270. The access right assignment unit 270 assigns the network access right to the user terminal 170 based on the information transmitted by the second country communication company server.

In accordance with the present optional embodiment, although a GPS function is not included in the user terminal 170, it is difficult to specify the location of the user terminal 170 due to a malfunction, etc., or an IMSI (user identification information) corresponding to the user terminal 170 is exposed to hacking, etc., the second country communication company server 150 can easily set a network access right in the user terminal 170 based on a GUTI received by the user terminal 170 when the user stayed in the first country.

In this case, not only information to identify the user, but unique code of an eNB that is installed in a city of the second country that the user enters and that first wirelessly communicates with the user terminal 170 may be inserted into the GUTI. The second country communication company server 150 may check that the user has entered the second country based on the second country entry information input by the user by comparing the code of the eNB with the location where network access approval information is transmitted.

Figure 3:
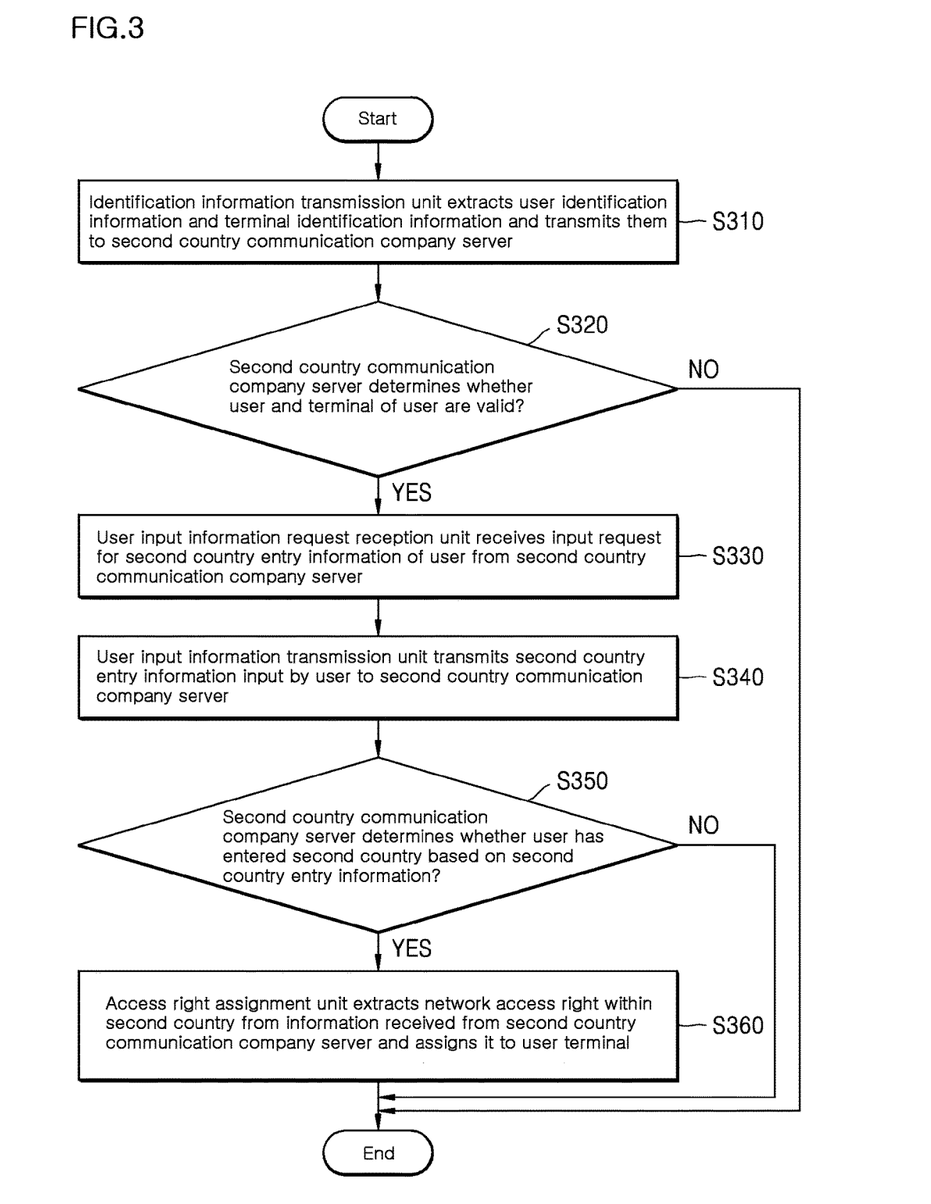
FIG. 3 is a diagram showing a flowchart of an example of a method of setting a network access right according to the present invention.

FIG. 3 is a diagram showing a flowchart of an example of a method of setting a network access right according to the present invention.

The of setting a network access right according to FIG. 3 may be implemented by the apparatus for setting a network access right described in FIG. 2, and thus a description redundant with that of FIG. 2 is omitted.

First, the identification information transmission unit extracts user identification information and terminal identification information from the terminal of a user who stays in a first country, and transmits them to the second country communication company server (S310).

The second country communication company server receives the user identification information and the terminal identification information from the identification information transmission unit and determines whether the user and the terminal of the user are valid based on the user identification information and the terminal identification information (S320).

If the second country communication company server determines that the user and the user terminal are valid, the user input information request reception unit receives an input request for second country entry information of the user from the second country communication company server (S330).

The user inputs the second country entry information through an input device included in the user terminal in response to the input request of the second country entry information displayed on a screen of the user terminal. The user input information transmission unit transmits the second country entry information, input by the user, to the second country communication company server (S340). At step S340, the user may pay a charge for a network service to be used in the second country in advance while inputting the second country entry information. If payment-related information input by the user is valid, the second country communication company server may schedule information for setting a network access right within the second country in the user terminal so that the information is transmitted when the user terminal is located in the second country within a specific period based on the second country entry information. The information scheduled by the second country communication company server may be deleted if the user does not enter the second country or if the user cancels the payment.

The second country communication company server receives the second country entry information from the user input information transmission unit and determines whether the user has entered the second country based on the second country entry information (S350). At step S350, the second country communication company server may determine whether the user has entered the second country by receiving information identical with network access approval information transmitted to the user terminal when the user stayed in the first country or information corresponding to the network access approval information from the user terminal. Furthermore, at step S350, the second country communication company server may determine that the user has entered the second country based on the second country entry information based on the user identification information and terminal identification information transmitted by the user terminal and location information (GPS information) of the user terminal.

If the second country communication company server determines that the user has entered the second country based on the second country entry information at step S350, it transmits information for setting a network access right in the user terminal. The access right assignment unit assigns the network access right within the second country to the user terminal based on the information received from the second country communication company server (S360).

Figure 4:
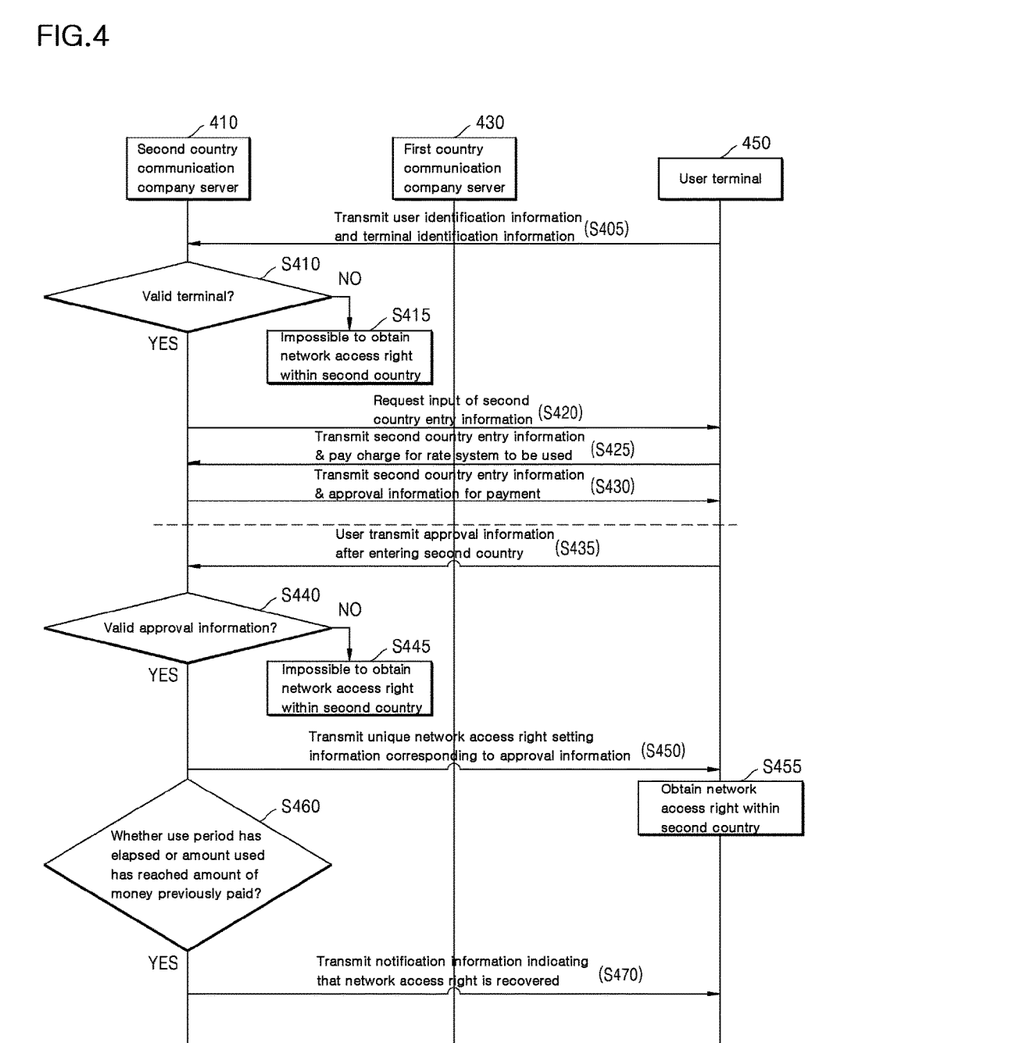
FIG. 4 is a diagram showing a method of setting a network access right in a time-series manner according to the present invention.

FIG. 4 is a diagram showing a method of setting a network access right in a time-series manner according to the present invention.

Referring to FIG. 4, the method of setting a network access right according to the present invention may be implemented based on information transmitted and received between a second country communication company server 410, a first country communication company server 430 and a user terminal 450. The apparatus for setting a network access right may be included in the user terminal 450 in order to transmit/receive various types of information to/from the second country communication company server 410 or an application for implementing the method of setting a network access right is installed in the user terminal 450. Hereinafter, t description redundant with that of FIGS. 2 and 3 is omitted.

The user terminal 450 transmits user identification information and terminal identification information to the second country communication company server 410 (S405).

The user terminal 450 is a terminal that receives input from a user who stays in the first country. The user terminal 450 is still located in the first country and has not experienced a process for directly communicating with the second country communication company server 410. Accordingly, in the following steps, information transmitted and received between the user terminal 450 and the second country communication company server 410 is considered to pass through the first country communication company server 430 unless specifically limited otherwise.

In this case, the first country communication company server 430 and the second country communication company server 410 have established an alliance in advance. Each of the company servers may authenticate the user and the user terminal 450 and may transmit and receive information for setting a network access right within the second country in the user terminal 450 over a communication network. As described above, the second country communication company server 410 may request the first country communication company server 430 to transmit specific information or may periodically fetch pieces of recently updated information from the first country communication company server 430.

The second country communication company server 410 confirms the validity of the user identification information and terminal identification information received from the user terminal 450 at step S405 (S410). In this process, the second country communication company server 410 may previously receive information necessary to confirm whether the user identification information and the terminal identification information are valid from the first country communication company server 430 or may request the information from the first country communication company server 430 after receiving the user identification information and the terminal identification information.

As described above with reference to FIG. 2, what the user identification information is valid means that the user is a person who has legitimately made a communication contract with the first country communication company. What the terminal identification information is valid means that there is no error in the manufacturer, manufacturing country, etc. of the user terminal 450 and the frequency of a signal used by the user terminal 450 is a model that supports a frequency band supported by the second country communication company. That is, to determine whether the user identification information and the terminal identification information are valid means to determine whether the user and the user terminal are a user and user terminal which can request a network access right within the second country from the second country communication company server 410.

In an optional embodiment of step S410, the second country communication company server 410 may also receive a result regarding whether the user identification information and the terminal identification information are valid from the first country communication company server 430. In accordance with the present optional embodiment, the first country communication company server 430 determines whether the user and the user terminal 450 are a user and user terminal which have a network access right within the second country based on the user identification information and terminal identification information received from the user terminal 450. A result of the determination is transmitted to the second country communication company server 410.

If any one of the user identification information and the terminal identification information is invalid information at step S410, the second country communication company server 410 determines that a network access right within the second country is not present in the user terminal 450 and transmits a result of the determination to the user terminal 450 via the first country communication company server 430 (S415).

If both the user identification information and the terminal identification information are valid information at step S410, the second country communication company server 410 requests the input of second country entry information from the user terminal 450 via the first country communication company server 430 (S420). Next, the user terminal 450 transmits the second country entry information, input to the user terminal 450 in response to the input request for the second country entry information received from the second country communication company server 410, to the second country communication company server 410 via the first country communication company server 430 (S425). At step S425, the user terminal 450 may transmit payment information about a charge for a network service in the second country along with the second country entry information.

The second country communication company server 410 receives the second country entry information and the payment information about the charge for the network service from the user terminal 450, and transmits approval information for the second country entry information and the payment information to the user terminal 450 (S430). In some embodiments, the approval information transmitted from the second country communication company server 410 to the user terminal 450 at step S430 may be information having a simple meaning that notifies the user that the second country entry information and the payment information have been determined to be valid by the second country communication company server 410, and may be information for confirming whether the user has entered the second country while carrying the user terminal 450 like the aforementioned GUTI.

Steps S405 to S430 described so far are performed when the user stays in the first country. Steps subsequent to step S435 are performed after the user enters the second country while carrying the user terminal 450. From FIG. 4, it may be seen that a dotted line is indicated at the boundary of steps S430 and S435 and the dotted line visually indicates a temporal criterion by which the user and the user terminal 450 move from the first country to the second country.

When the user enters the second country, the user terminal 450 transmits the approval information, received from the second country communication company server 410 at step S430, to the second country communication company server 410 (S435). At step S435, the second country communication company server 410 may confirm that the user has entered the second country while carrying the user terminal 450 based on location information transmitted from the user terminal 450 to the second country communication company server 410.

Since the user has entered the second country while carrying the user terminal 450 at step S435, the second country communication company server 410 and the user terminal 450 transmits/receives various types of information without the intervention of the first country communication company server 430.

The second country communication company server 410 determines whether the approval information received from the user terminal 450 is information identical with or corresponding to the approval information transmitted to the user terminal 450 at step S430 (S440). If the approval information received from the user terminal 450 is not information identical with or corresponding to the approval information transmitted from the second country communication company server 410 to the user terminal 450 at step S430, the second country communication company server 410 determines that the user terminal 450 is not a terminal in which a network access right within the second country should be set (S445).

In contrast, if the approval information received from the user terminal 450 is information identical with or corresponding to the approval information transmitted from the second country communication company server 410 to the user terminal 450 at step S430, the second country communication company server 410 transmits information for setting a network access right (network access right setting information) to the user terminal 450 (S450).

The user terminal 450 may obtain the network access right within the second country based on the network access right setting information received from the second country communication company server 410 (S455). The network access right obtained by the user terminal 450 at step S455 is temporarily maintained based on a rate system paid by the user and the second country entry information.

The second country communication company server 410 determines whether the period in which the network access right within the second country of the user terminal 450 is maintained has elapsed or whether the amount of network used has reached the amount of money previously paid at step S425 (S460). If the period in which the network access right is maintained, designated by the user, has elapsed or the amount of network used has reached the amount of previously paid money, the second country communication company server 410 transmits notification information, indicating that the network access right is recovered, to the user terminal 450 (S470). At step S470, the user checks the notification information received from the second country communication company server 410 and may extend the period in which the network access right is maintained or may additionally pay a data rate system, etc. necessary to use a network. The second country communication company server 410 may transmit information for additionally assigning a network access right to the user terminal 450 through a procedure simpler than the aforementioned process with respect to the user and the user terminal 450 that have been already primarily verified.

In accordance with the present invention, a user can temporarily use the network of a communication company in a second country after entering the second country by selecting and paying a charge for a network service to be used in the second country while the user stays in a first country. In this case, the term "temporarily" is different depending on a period designated by the user and the amount of money paid by the user. The user can freely adjust the period in which the network is used depending on the period in which the user stays in the second country. The time when the user obtains a network access right within the second country through the user terminal is after the user enters the second country while the user carries the user terminal. Accordingly, if the user does not inevitably enter the second country, evidence indicating that the user has not used the network in the second country becomes facilitated. Accordingly, the user can easily get the amount of money consumed to obtain the network access right back from the communication company in the second country through a simple procedure.

In particular, compared with an existing method, in order to obtain a network access right in a second country, a user who stays in a first country using the local USIM of the second country has to inconveniently purchase a local USIM in the first country from a seller who professionally sells a USIM for a foreign country in advance or has to purchase a local USIM using a foreign language in an agent for a communication company in the second country. In accordance with the present invention, however, the user can obtain the network access right within the second country through an application installed in the user terminal and written in a language familiar to the user. Furthermore, the user does not need to pay a cost for the local USIM itself because the user has only to pay a charge for a network service provided by the communication company in the second country.

If the network access right within the second country is obtained through roaming, there is a disadvantage in that when an acquaintance of a user who resides in a second country makes a call to a user who has entered the second country, the call is considered to be an international call and expensive compared to a case where a local USIM is use by the nature of an alliance between the communication companies of a first country and the second country and a technical characteristic in which a telephone number used in the first country is used without a change. In accordance with the present invention, the user does not need to pay a very high roaming cost after returning from the second country to the first country because the user can pay a data fee in advance by checking the data fee with an eye. Accordingly, the possibility that a use charge is predicted can be secured.

In addition to the aforementioned characteristics, in accordance with the present invention, in the process of transmitting the terminal identification information (an IMEI, etc.) to the communication company server of the second country, if there is a communication company from which it is difficult or impossible to obtain a network access right due to a difference in a communication method, the user may not select the communication company. Accordingly, the user's confusion generated when the user selects a communication company after entering the second country can be prevented. For example, Verizon Communications, that is, a communication company in U.S.A., adopts CDMA as a communication method, and thus the user terminal of a user who uses Verizon cannot obtain a network access right in Korea. In the present invention, user identification information and terminal identification information are transmitted to the communication company server of a country that the user will enter, whether the user cannot obtain a network access right due to a difference in the communication method between the terminal of the user and the communication company of the country that the user will enter is checked in advance, and thus a proper communication company in the second country can be selected.

The aforementioned embodiments according to the present invention may be implemented in the form of a computer program capable of being executed through various elements on a computer. Such a computer program may be recorded on a computer-readable medium. In this case, the medium may include magnetic media, such as a hard disk, a floppy disk and a magnetic tape, optical recording media, such as a CD-ROM and a DVD, magneto-optical media, such as a floptical disk, and hardware devices specially configured to store and execute program instructions, such as ROM, RAM and flash memory.

Meanwhile, the computer program may have been specially designed and configured for the present invention or may be known and available to those skilled in the computer software field. Examples of the computer program may include not only machine language code, such as that produced by a compiler, but also high-level language code executable by a computer using an interpreter, etc.

Specific executions described in the present invention are embodiments and are not intended to limit the scope of the present invention in any method. For the simplicity of the specification, the writing of conventional electronic elements, control systems, software and other functional sides of the systems may be omitted. Furthermore, the connections or connection members of the lines between the elements shown in the drawings illustrate functional connections and/or physical or circuit connections. In an actual device, the connections or connection members may be substituted or may be indicated as additional various functional connections, physical connections or circuit connections. Furthermore, an element may not be an element essentially necessary for the application of the present invention unless a detailed reference, such as "essential" or "importantly", is given.

The use of the term "the" and an indication term similar to "the" in the specification (particularly, in the claims) of the present invention may correspond to both the singular form and the plural form. Furthermore, in the present invention, if a range has been written, this means that an invention to which an individual value belonging to the range has been applied is included (if there is no contradictory description) and is the same that each individual value forming the range is described in the detailed description of the invention. Finally, the steps forming the method according to the present invention may be performed in proper order unless the order is clearly described or there is contradictory writing. The present invention is not essentially limited according to the order of the steps described. In the present invention, the use of all the examples or an exemplary term (for example, "etc.") is for simply describing the present invention in detail, and the range of the present invention is not limited by the examples or exemplary term unless the examples or exemplary term is restricted by the claims. Furthermore, those skilled in the art may understand that various modifications, combinations and changes can be constructed depending on a design condition and factor within the category of the attached claims or an equivalent thereof.

INDUSTRIAL APPLICABILITY

The aforementioned embodiments of the present invention may be applied to implement an apparatus included in a terminal used by a user who performs a task while traveling to several countries or an application installed in the terminal.

The invention claimed is:

1. A method of setting a network access right, comprising:
    extracting user identification information and terminal identification information from a terminal of a user who stays in a first country and transmitting the user identification information and the terminal identification information to a communication company server of a second country;
    receiving an input request for second country entry information of the user transmitted by the communication company server of the second country based on a result of a determination of the communication company server of the second country which has determined that the user is a user to which a network access right has been assigned in the first country through the terminal authenticated by a communication company server of the first country based on the extracted user identification information and the terminal is a terminal capable of using a network in the second country based on the extracted terminal identification information;
    transmitting the second country entry information inputted to the terminal in response to the input request to the communication company server of the second country; and
    assigning a network access right within the second country to the terminal of the user based on information transmitted by the communication company server of the second country if the terminal is found to be located in the second country by the communication company server of the second country based on location information transmitted from the terminal to the communication company server of the second country.

2. The method of claim 1, further comprising:
    receiving network access approval information corresponding to the second country entry information from the communication company server of the second country in the first country,
    wherein the assigning of the network access right within the second country comprises:
        transmitting the network access approval information to the communication company server of the second country if the terminal is found to be located in the second country by the communication company server of the second country based on the location information transmitted from the terminal to the communication company server of the second country; and
        assigning the network access right within the second country to the terminal of the user based on information transmitted by the communication company server of the second country in response to the network access approval information transmitted to the communication company server of the second country.

3. The method of claim 2, wherein the network access approval information is a globally unique temporary identifier (GUTI).

4. The method of claim 1,
    wherein, in the receiving of the input request for the second country entry information, an input request for network service information in addition to the second country entry information is received from the communication company server of the second country,
    wherein, in the transmitting of the second country entry information, the second country entry information and the network service information inputted to the terminal in response to the input request are transmitted to the communication company server of the second country, and
    wherein, in the assigning of the network access right within the second country, if the terminal is found to be located in the second country by the communication company server of the second country based on the location information transmitted from the terminal to the communication company server of the second country, the network access right within the second country is extracted from approval information transmitted by the communication company server of the second country based on the second country entry information and the network service information and assigned to the terminal of the user.

5. The method of claim 4,
    wherein the second country entry information is information about a date and time in which the user enters the second country, and
    wherein the network service information is at least one piece of data rate system information predetermined to be capable of being provided to the user by the communication company server of the second country.

6. The method of claim 1, wherein the user identification information comprises code of the first country, communication company code of the first country, and subscription authentication code of the user.

7. The method of claim 1, wherein the terminal identification information comprises a manufacturing country of the terminal, a manufacturing date of the terminal, and a manufacturer of the terminal.

8. The method of claim 1, wherein the terminal identification information is an international mobile equipment identity (IMEI).

9. A non-transitory computer-readable recording medium on which a program for executing the method according to claim 1 has been recorded.

10. An apparatus for setting a network access right, comprising:

an identification information transmitter configured to extract user identification information and terminal identification information from a terminal of a user who stays in a first country and transmit the user identification information and the terminal identification information to a communication company server of a second country;

a user input information request receiver configured to receive an input request for second country entry information of the user transmitted by the communication company server of the second country based on a result of a determination of the communication company server of the second country which has determined that the user is a user to which a network access right has been assigned in the first country through the terminal authenticated by a communication company server of the first country based on the extracted user identification information and the terminal is a terminal capable of using a network in the second country based on the extracted terminal identification information;

a user input information transmitter configured to transmit the second country entry information inputted to the terminal in response to the input request to the communication company server of the second country; and an access right assigner configured to assign a network access right within the second country to the terminal of the user based on information transmitted by the communication company server of the second country if the terminal is found to be located in the second country by the communication company server of the second country based on location information transmitted from the terminal to the communication company server of the second country.

11. The apparatus of claim 10, wherein the user input information request receiver is further configured to receive an input request for network service information from the communication company server of the second country in addition to the second country entry information, wherein the user input information transmitter is further configured to transmit the second country entry information and the network service information inputted to the terminal in response to the input request to the communication company server of the second country, and wherein the access right assigner is further configured to extract the network access right within the second country from approval information transmitted by the communication company server of the second country based on the second country entry information and the network service information if the terminal is found to be located in the second country by the communication company server of the second country based on the location information transmitted from the terminal to the communication company server of the second country, and assign the extracted network access right to the terminal of the user.

* * * * *